United States Patent [19]
Sommer

[11] Patent Number: 5,806,641
[45] Date of Patent: Sep. 15, 1998

[54] INDEPENDENT CLUTCH AND BRAKE FOR A PRESS

[75] Inventor: Gordon Maurice Sommer, Grosse Pointe Farms, Mich.

[73] Assignee: Midwest Brake Bond Co., Warren, Mich.

[21] Appl. No.: 675,437

[22] Filed: Jun. 27, 1996

[51] Int. Cl.⁶ .................................................. F16D 67/04
[52] U.S. Cl. ........................................................ 192/18 A
[58] Field of Search ............................... 192/18 A, 18 R, 192/12 C, 12 R

[56] References Cited

U.S. PATENT DOCUMENTS

| | | |
|---|---|---|
| 2,848,082 | 8/1958 | Dehn . |
| 3,614,999 | 10/1971 | Sommer . |
| 3,696,898 | 10/1972 | Sommer . |
| 3,713,517 | 1/1973 | Sommer . |
| 3,835,971 | 9/1974 | Spanke et al. . |
| 3,946,840 | 3/1976 | Sommer . |
| 4,095,523 | 6/1978 | Drungil . |
| 4,135,611 | 1/1979 | Spanke . |
| 4,171,038 | 10/1979 | Sommer . |
| 4,183,425 | 1/1980 | Sommer . |
| 4,186,827 | 2/1980 | Spanke . |
| 4,346,796 | 8/1982 | Ueno . |
| 4,353,448 | 10/1982 | Sommer . |
| 4,356,900 | 11/1982 | Sommer . |
| 4,377,222 | 3/1983 | Sommer . |
| 4,422,540 | 12/1983 | Sommer . |
| 4,424,887 | 1/1984 | Sommer . |
| 4,432,443 | 2/1984 | Sommer . |
| 4,460,075 | 7/1984 | Sommer . |
| 4,472,077 | 9/1984 | Sommer . |
| 4,493,613 | 1/1985 | Sommer . |
| 4,494,635 | 1/1985 | Sommer . |
| 4,496,032 | 1/1985 | Sommer . |
| 4,506,772 | 3/1985 | Sommer . |
| 4,527,681 | 7/1985 | Sommer . |
| 4,552,255 | 11/1985 | Sommer . |
| 4,562,907 | 1/1986 | Maeda . |
| 4,598,804 | 7/1986 | Sommer . |
| 4,600,368 | 7/1986 | Sommer . |
| 4,601,640 | 7/1986 | Sommer . |
| 4,616,739 | 10/1986 | Sommer . |
| 4,693,350 | 9/1987 | Sommer . |
| 4,765,448 | 8/1988 | Sommer . |
| 4,781,543 | 11/1988 | Sommer . |
| 4,785,926 | 11/1988 | Matson . |
| 4,865,172 | 9/1989 | Sommer . |
| 4,921,078 | 5/1990 | Sommer . |
| 5,186,288 | 2/1993 | Sommer . |
| 5,190,129 | 3/1993 | Sommer . |
| 5,194,057 | 3/1993 | Sommer . |
| 5,195,623 | 3/1993 | Sommer . |
| 5,285,879 | 2/1994 | Sommer . |
| 5,291,977 | 3/1994 | Sommer . |
| 5,323,888 | 6/1994 | Sommer . |
| 5,487,456 | 1/1996 | Sommer . |
| 5,573,092 | 11/1996 | Gabilondo ............................. 192/18 A |

*Primary Examiner*—Richard M. Lorence
*Attorney, Agent, or Firm*—Harness, Dickey & Pierce

[57] ABSTRACT

A conversion kit for an existing machine tool drive converts the machine tool drive from an air activated system to a hydraulically actuated system. The existing machine tool drive includes an air activated clutch and brake which are mechanically interlocked to simultaneously move the brake between an applied condition and a release condition and the clutch between a disengaged condition and an engaged condition. The conversion kit replaces the air activated clutch and brake with a hydraulically activated clutch and an independent hydraulically actuated brake and separates the activation of these devices. The separation of the activation of these devices permits the designing of a specified amount of overlap into the assemblies.

15 Claims, 4 Drawing Sheets

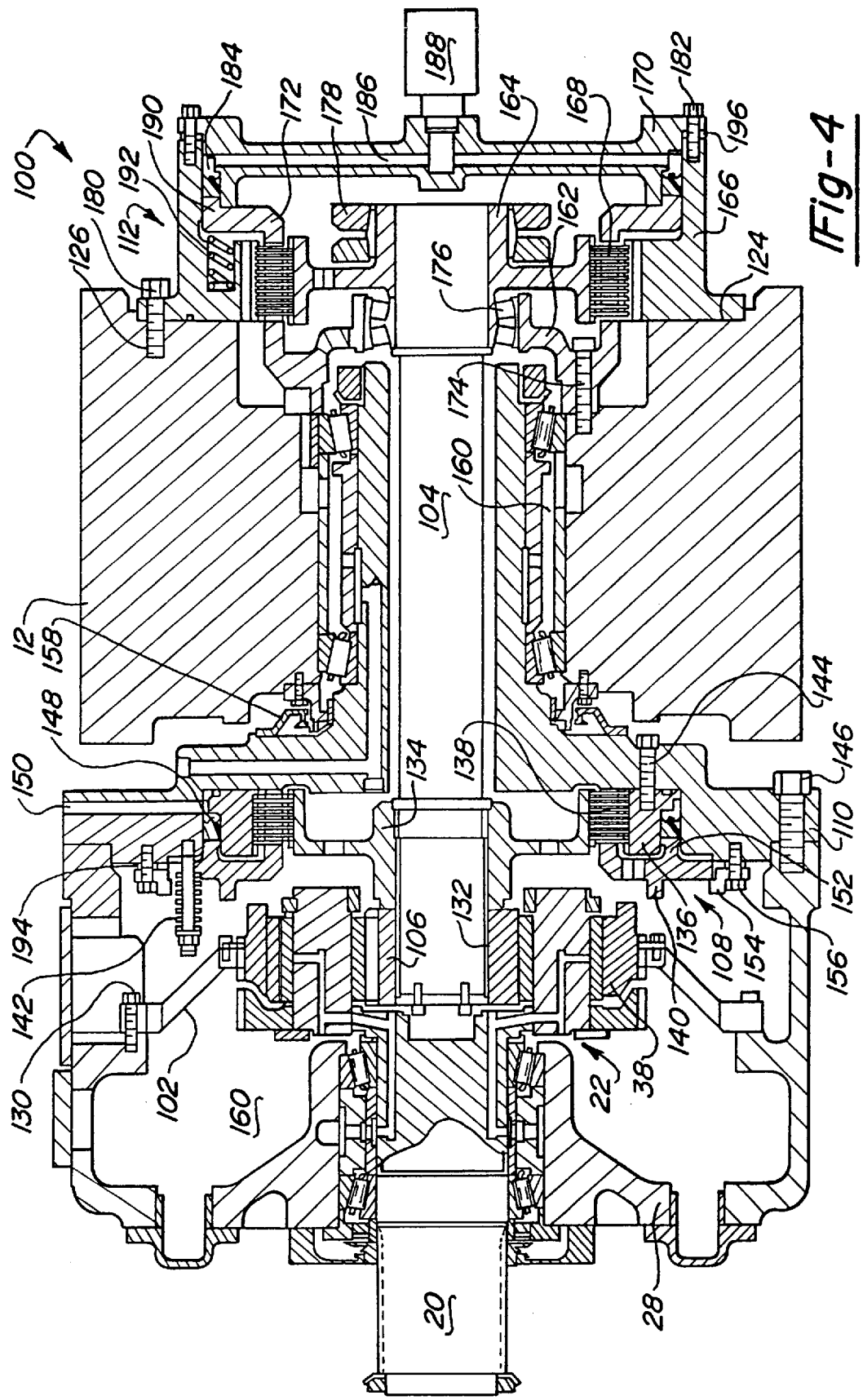

INDEPENDENT CLUTCH AND BRAKE FOR A PRESS

FIELD OF THE INVENTION

The present invention relates to press drives. More particularly, the present invention relates to a single-speed press drive using an oil shear clutch unit and a separate oil shear brake unit. The operation of the clutch is controlled with respect to the operation of the brake to provide a specified amount of overlap between their operation.

BACKGROUND OF THE INVENTION

Dry friction clutch/brakes depend upon the rubbing of a dry friction material against dry reaction members to start and stop a press. This continuous rubbing causes wearing of both the friction material and the reaction members as well as causing the generation of heat in these members. The faster the press operates and the faster the flywheel rotates, greater is the amount of wear and heat which are generated. This generation of wear and heat requires periodic gap adjustment between the friction plates and the reaction members to keep the press operating correctly. The trip rate or cycle speed of a press equipped with a dry friction clutch/brake unit is limited because the mass of the unit determines its heat dissipation capacity. If the mass of the unit is increased to increase its heat dissipation capacity, the inertia that must be started and stopped is also increased. These factors define a closed loop from which it is impossible to escape when trying to increase the performance of the system.

Oil shear brake and clutch units were developed to eliminate the problems associated with the dry friction type of units. Properly designed oil shear clutch/brake drives offer the advantage of little or no wear of the plates in the disk stacks and no brake fade. These oil shear units thus provide a more precise operation of the press and dramatically increase press up-time. The oil film between the adjacent disks carries the heat generated by the start-stops of the press away from the disk stacks. This removal of heat offers the advantage that there is now no practical limit in the press trip rate or in the flywheel speed. In addition, this removal of heat provides unlimited inching capabilities.

A typical air operated prior art press drive assembly is shown in FIG. 1 and is designated generally by reference numeral 10. Drive assembly 10 is designed to receive rotational drive from an input member or flywheel 12 of a press or other machine and provide rotational drive to a drive shaft (not shown) of the machine. Drive assembly 10 intermittently drives the drive shaft through one cycle stopping it at the same point after back cycle. Drive assembly 10 comprises a housing 16, an input shaft 18, an output shaft 20, a planetary gear train 22, an oil shear clutch 24 and an oil shear brake 26.

Housing 16 includes a front housing 28 and rear housing 30. Front housing 28 is attached to a stationary member of the press with input shaft 18 being attached to input member or flywheel 12 and output shaft 20 being attached to the drive shaft of the press. Flywheel 12 is rotatably supported by rear housing 30. Input shaft 18 is rotatably supported within housing 16 and forms a sun gear 32 for planetary gear train 22. Output shaft 20 is also rotatably supported within housing 16 and forms a planetary gear carrier 34 for planetary gear train 22. Planetary gear train 22 comprises sun gear 32, planetary gear carrier 34, a plurality of planet gears 36 and a ring gear 38.

Clutch 24 is disposed between ring gear 38 and stationary housing 16 to selectively lock ring gear 38 to housing 16. Clutch 24 is biased to a disengaged condition by a plurality of springs 40. Brake 26 is disposed between planetary gear carrier 34 and housing 16 to selectively lock planetary gear carrier 34 to housing 16. The plurality of springs 40 bias brake 26 into an applied condition. The selective operation of clutch 24 and brake 26 is mechanically interconnected by a plurality of pins 42 and is controlled by a pneumatically actuated piston 44 which moves longitudinally within a piston chamber 46 defined by rear housing 30 of housing 16.

The operation of drive assembly 10 begins with flywheel 12 rotating which in turn rotates input shaft 18 and sun gear 32. Sun gear 32 rotates planet gears 36 which rotate ring gear 38 which is free to rotate due to clutch 24 being biased by springs 40 into its disengaged condition. Output shaft 20 and thus the drive shaft of the press and planetary gear carrier 34 are prohibited from rotating due to brake 26 being biased by springs 40 into its applied condition. In order to rotate output shaft 20 and the drive shaft of the press by flywheel 12, pressurized air is supplied to piston chamber 46 to move piston 44 to the left as shown in FIG. 1. The movement to the left of piston 44 engages clutch 24 and releases brake 26 simultaneously due to pins 42 which mechanically interlock the operation of clutch 24 and brake 26. With clutch 24 engaged and brake 26 released, rotation of flywheel 12 rotates input shaft 18 and sun gear 32. Rotation of sun gear 32 rotates planet gears 36 which rotate within ring gear 38 to rotate planetary gear carrier 34 due to ring gear 38 being coupled to housing 16 by the engagement of clutch 24. Planetary gear carrier 34 is free to rotate due to the release of brake 26 and thus output shaft 20 and the drive shaft of the press are driven by flywheel 12. The discontinuing of drive between flywheel 12 and output shaft 20 is accomplished by releasing pressurized air from piston chamber 46 to disengage clutch 24 and apply brake 26.

Prior art drive assembly 10 has performed satisfactorily in the manufacturing community with the oil shear clutch and brake systems solving various problems associated with the dry friction clutch and brake systems. The manufacturing community continues to become more and more safety conscious with the operation of presses and machines being of particular interest. Safety devices such as light curtains are being added to presses and machines to protect the operators and prevent accidents in response to new and more stringent safety requirements. One of the safety requirements for the press or machine when these various safety devices are incorporated is the speed at which the operation of the press or machine can be stopped. These prior art air activated drive units are not able to meet the stopping times which are a part of these newly adopted safety requirements. Thus, the continued development of drives is being directed to replacing and/or reworking the prior art drives to bring their performance into compliance with the new and more stringent safety requirements.

SUMMARY OF THE INVENTION

The present invention provides the art with a system which reworks the prior art drive assemblies by replacing the air activated mechanically interlocked brake and clutch with a hydraulically operated brake and a hydraulically operated clutch which are separate assemblies. The separation of the two units provides the flexibility to design into units the controlled coordination between the operation of the brake unit and the operation of the separate clutch unit to accurately provide specified amounts of overlap. The operation of the clutch unit and the brake unit and the control of the amount of overlap between them is accomplished utilizing a single valve.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 4 is a side view, partially in cross-section, of the press drive shown in FIG. 3 in the fully assembled condition.

DETAILED DESCRIPTION OF THE PREFERRED EMBODIMENT

Figure 1:
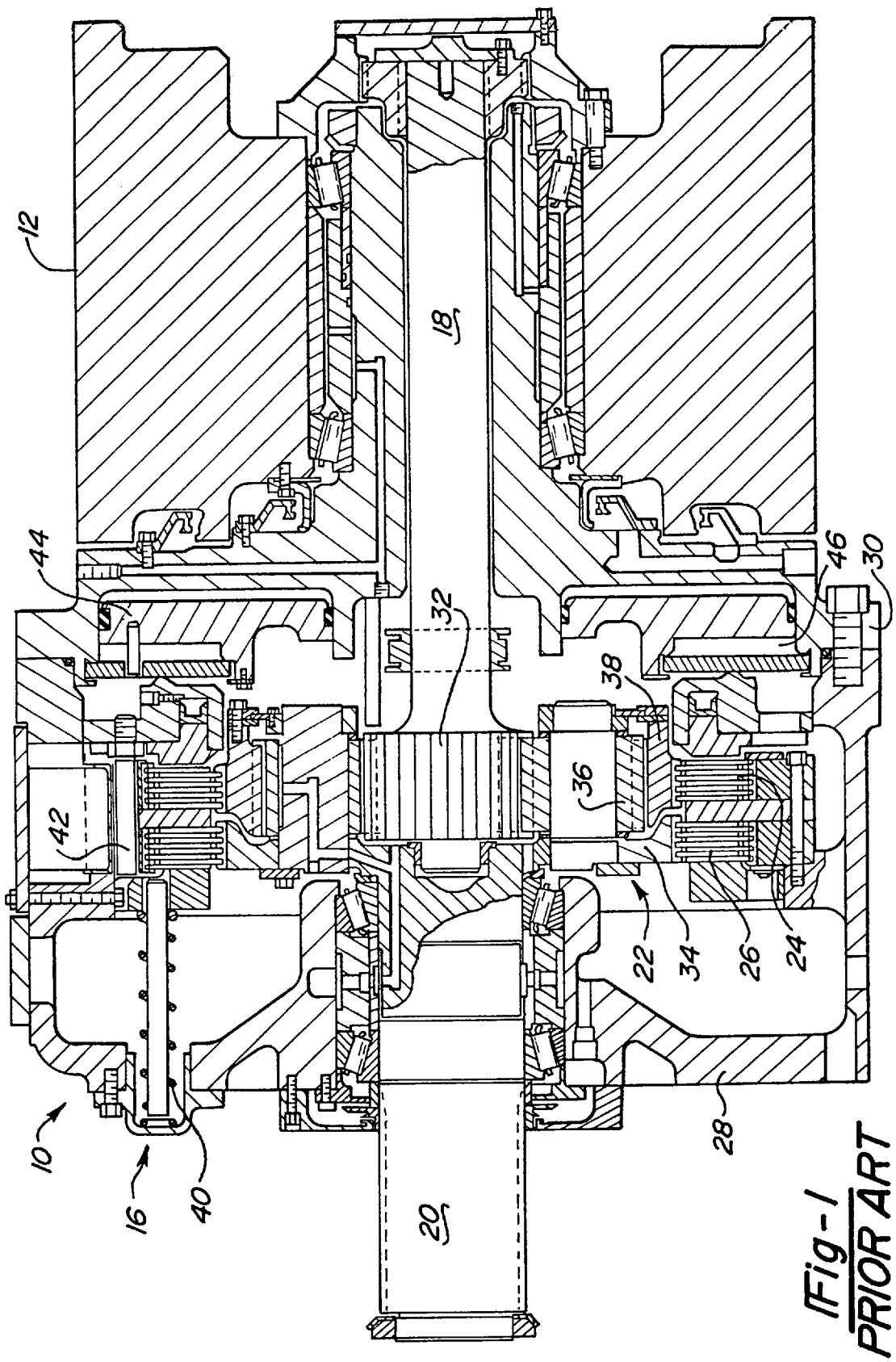
FIG. 1 is a side view, partially in cross-section, of a pneumatically controlled prior art press drive assembly installed between a flywheel and an input shaft of a press.
Figure 2:
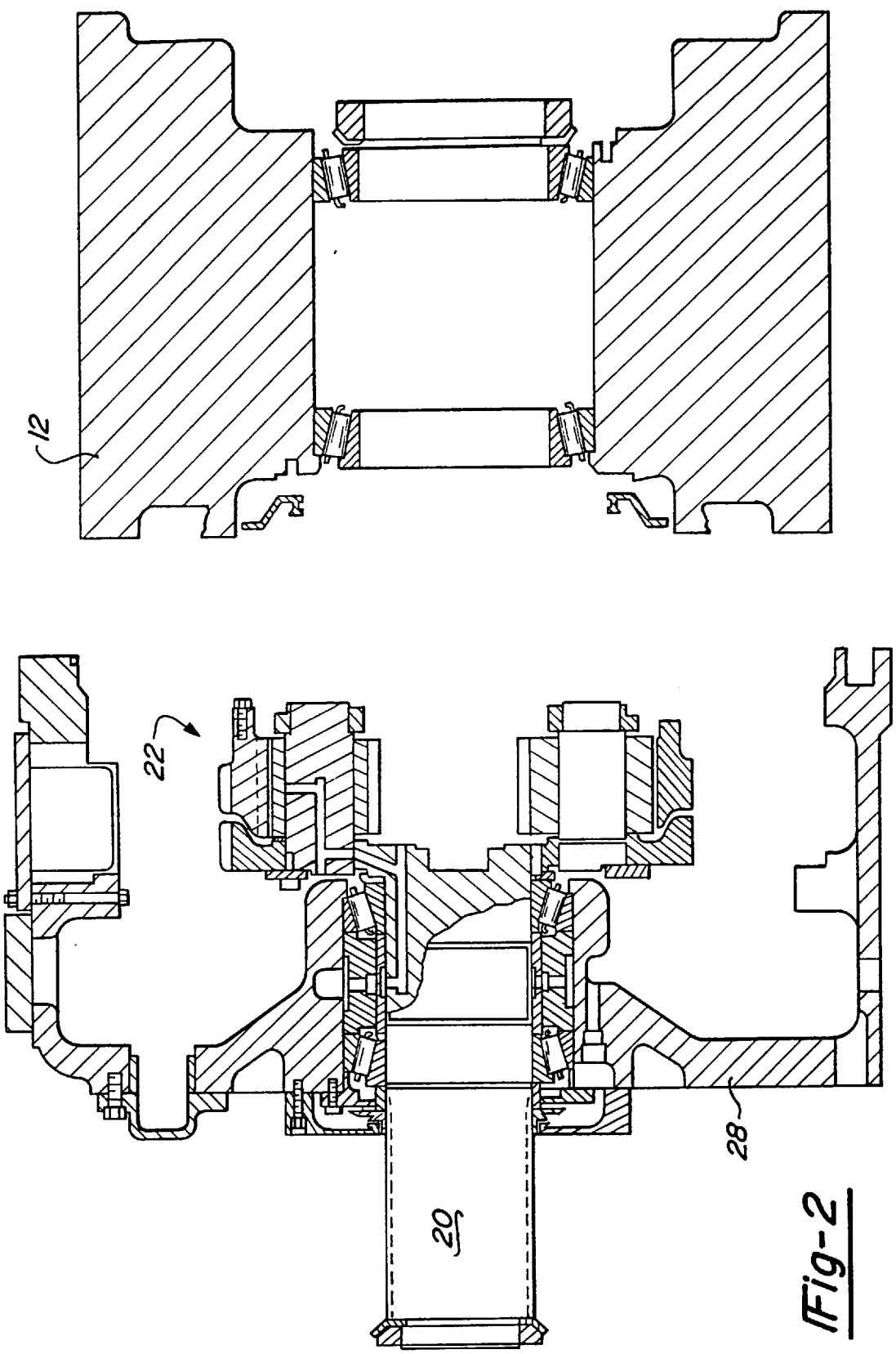
FIG. 2 is a side view, partially in cross-section, of the press drive assembly shown in FIG. 1 with the components removed which are to be replaced.
Figure 3:
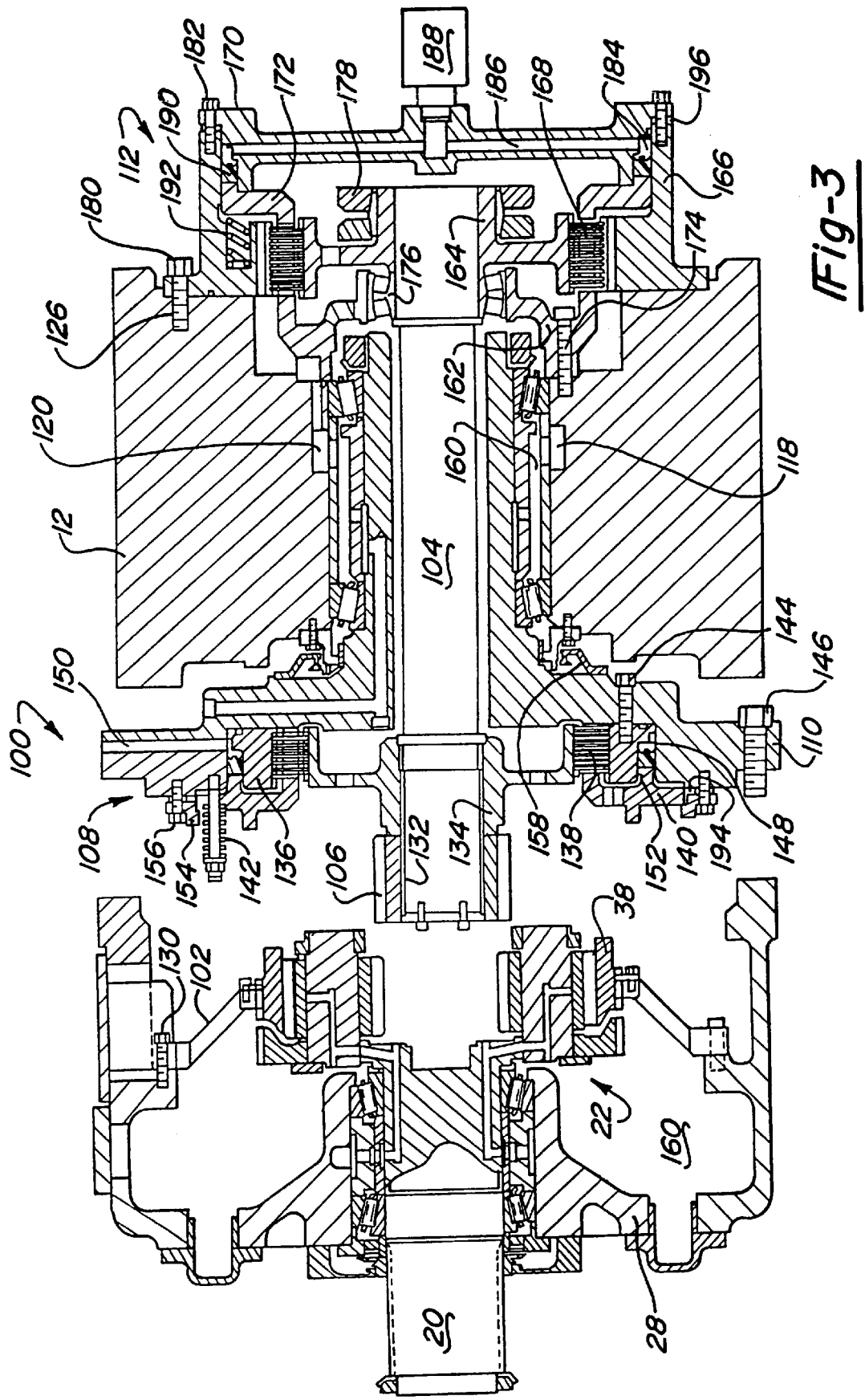
FIG. 3 is a side view, partially in cross-section, of a press drive assembly in accordance with the present invention in a partially assembled condition.

Referring now to the drawings in which like reference numerals designate like or corresponding parts throughout the several views, there is shown in FIG. 3 a drive assembly in accordance with the present invention which is designated generally by the reference numeral 100. Drive assembly 100 is a reworked version of drive assembly 10 shown in FIG. 1. In order to rework drive assembly 10 to convert it from pneumatic operation to hydraulic operation, various components of drive assembly 10 must be replaced and/or reworked. FIG. 2 illustrates drive assembly 10 with the obsolete components removed. FIG. 2 thus illustrates the carry over parts which include front housing 28 of housing 16, output shaft 20, planetary gear train 22 without sun gear 32 and input member or flywheel 12. Sun gear 32, oil shear clutch 24, oil shear brake 26 and rear housing 30 of housing 16 have been removed and are no longer required with the exception of sun gear 32 which may be able to be reworked to fit into drive assembly 100. While drive assembly 100 is shown for exemplary purposes replacing a press drive assembly in combination with a press having a flywheel, it is to be understood that drive assembly 100 can be utilized to update other types of machines utilizing other types of drives.

Drive assembly 100 includes the components from drive assembly 10 shown in FIG. 2 with the addition of an anchoring plate 102, an input shaft 104, a sun gear 106, an independent oil shear brake assembly 108, a rear housing 110 and an independent oil shear clutch assembly 112. Prior to the assembly of these new components, flywheel 12 must be reworked by providing an annular groove 118 and an oil passage 120 and providing mounting capabilities for oil shear clutch assembly 112 as shown at 126. In addition, sun gear 106 can be a new component or sun gear 106 can be manufactured from the integral input shaft 18 and sun gear 32 shown in FIG. 1. The use of sun gear 32 to provide sun gear 106 further reduces the number of new components required for the conversion of drive assembly 10 into drive assembly 100.

Referring now to FIGS. 3 and 4, once the removal and reworking of the components of drive assembly 10 has been completed, drive assembly 100 can be assembled. Anchoring plate 102 is installed between front housing 28 and ring gear 38 permanently locking ring gear 38 to front housing 28. Anchoring plate 102 is connected to front housing 28 using a plurality of bolts 130. Anchoring plate 102 includes a splined member which mates with ring gear 38 to prohibit its rotation. Input shaft 104 is rotatably coupled to sun gear 106 by a plurality of splines 132 or by other means known well in the art.

Oil shear brake assembly 108 comprises a brake hub 134, a reaction member 136, a plurality of interleaved friction disks 138, an application member 140 and a plurality of coil springs 142. Brake hub 134 is rotatably coupled to input shaft 104 by the plurality of splines 132 or by other means known well in the art. Reaction member 136 is fixedly secured to rear housing 110 by a plurality of bolts 144. Rear housing 110 is fixedly secured to front housing 28 using a plurality of bolts 146. The plurality of friction disks 138 are disposed between hub 134 and reaction member 136 and are alternatively splined to them such that every other one, or approximately one half, of disks 138 rotate with hub 134 and input shaft 104 while the remaining disks 138 are locked to rear housing 110.

Rear housing 110 and reaction member 136 define a chamber 148 which is supplied with pressurized hydraulic fluid through a passageway 150 through rear housing 110 to release and apply brake assembly 108. Application member 140 includes an integral piston 152 which is located within chamber 148 such that application member 140 moves axially with respect to rear housing 110 to release and apply brake assembly 108. The axial movement of application member 140 is limited by a retainer 154 which is attached to rear housing 110 by a plurality of bolts 156. The plurality of springs 142 bias application member to the right as shown in FIGS. 3 and 4 to place brake assembly 108 into its applied condition. The biasing of application member 140 causes the plurality of friction disks 138 to be compressed between application member 140 and rear housing 110 locking brake hub 134 and thus input shaft 104 to rear housing 110. Brake assembly 108 is released by supplying pressurized fluid to chamber 148 through passageway 150 to move application member 140 to the left as shown in FIGS. 3 and 4, against the load being exerted by coil springs 142. This releases the compression between friction disks 138 allowing the rotation of input shaft 104 with respect to rear housing 110. Release of pressurized fluid from chamber 148 allows coil springs 142 to again bias brake assembly 108 into its applied condition.

Flywheel 12, after rework, is rotatably supported by rear housing 110 in a similar manner and with the same bearing which rear housing 30 used to support flywheel 12. A seal assembly 158 is attached to flywheel 12 to isolate a cavity 160 formed by front housing 28, rear housing 110 and oil shear clutch assembly 112. Cavity 160 is provided with a recirculating supply of oil to lubricate the moving components of drive assembly 100 and provide oil for oil shear brake and clutch assemblies 108 and 110, respectively.

Clutch assembly 112 comprises a bearing support 162, a clutch hub 164, an outer housing 166, a plurality of friction disks 168, a cover 170 and an application member 172. Bearing support 162 is connected to flywheel 12 using a plurality of bolts 174 or any other means known well in the art. Bearing support 162 acts as an abutment member for the plurality of friction disks 168 and supports a bearing 176 which rotatably supports input shaft 104 with respect to flywheel 12. Clutch hub 164 is rotatably coupled to input shaft 104 by a compression pack 178 or by other means known well in the art. Outer housing 166 is connected to input member or flywheel 12 using a plurality of bolts 180.

The plurality of friction disks 168 are disposed between hub 164 and housing 166 and are alternately splined to them such that every other one, or approximately one half of disks 168 rotate with hub 164 and input shaft 104 while the remaining disks 168 brake with outer housing 166 and flywheel 12. Cover 170 is connected to outer housing 166 using a plurality of bolts 182. Cover 170 and outer housing 166 define a chamber 184 which is supplied with pressurized hydraulic fluid through a passageway 186 through cover 170 and a rotating union 188 coupled to cover 170. Application member 172 includes an integral piston 190 which is located within chamber 184 such that application member 172 moves axially with respect to outer housing 166 to engage and disengage clutch assembly 112. The axial movement of application member 172 is limited by cover 170. A plurality of springs 192 bias application member 172 to the right as shown in FIGS. 3 and 4 to place clutch assembly 112 into its disengaged condition. There is no compression between the plurality of friction disks 168 and flywheel 12 is free to rotate with respect to input shaft 104. Clutch assembly 112 is engaged by supplying pressurized fluid to chamber 184 through passageway 186 and rotary union 188 to move application member to the left as shown in FIGS. 3 and 4, against the load being exerted by coil springs 192. This movement of application member 172 causes the plurality of friction disks 168 to be compressed between application member 172 and bearing support 162 locking outer housing 166 and thus flywheel 12 to clutch hub 164 and thus input shaft 104. Release of pressurized fluid from chamber 184 allows coil springs 192 to again bias clutch assembly 112 into its disengaged condition.

As shown in FIG. 3, brake assembly 108, clutch assembly 112, input shaft 104, sun gear 106 and flywheel 12 comprise a single sub-assembly. Output shaft 20, planetary gear train 22, housing 28 and anchoring plate 102 comprise a second sub-assembly. The separation of the gear system from the separate clutch and brake units permit the servicing of the clutch and brake units without the need for disturbing the gear system and the components connected to it.

Brake assembly 108 operates to stop input shaft 104 and thus output shaft 20 from rotating with respect to flywheel 12 while clutch assembly 112 operates to cause input shaft 104 and thus output shaft 20 to be rotated by flywheel 12. Because these operations are independent and opposite to each other, it is necessary to accurately coordinate the application and release of brake assembly 108 with the engagement and disengagement of independent clutch assembly 112 to ensure that the proper amount of overlap is provided between the two assemblies. The present invention provides the unique coordination of the independent operation of brake assembly 108 with the independent operation of clutch assembly 112 by designing the two independent assemblies 108 and 112 such that the coordination of their operation is a function of the design of the two independent assemblies. The plurality of coil springs 142 and the plurality of coil springs 192 are designed to be generally identical in strength and number. Thus, the urging force that applies brake assembly 108 and the urging force that disengages clutch assembly 112 is generally identical. In addition, the size and dimensions of chamber 148 are generally identical to the size and dimensions of chamber 184 to provide the same area upon which the pressurized fluid reacts. Thus, when the same pressurized fluid is supplied to both chambers 148 and 184 simultaneously, brake assembly 108 will release simultaneously to the engagement of clutch assembly 112 even though these are two independent assemblies. In a similar manner, the disengagement of clutch assembly 112 and the application of brake assembly 108 will also occur simultaneously with the simultaneous release of pressurized fluid from chambers 148 and 184 and the reaction caused by springs 142 and 192. Thus, independent clutch assembly 112 and independent brake assembly 108 can be simultaneously controlled by a single valve.

When it is desired to accurately provide a specified amount of overlap between brake assembly 108 and clutch assembly 112, the biasing load which urges clutch assembly 112 into its disengaged position is reduced. This reduction in the biasing load can be accomplished by reducing the strength of the plurality of coil springs 192 but the preferred method is to reduce the number of coil springs 192 such that brake assembly 108 is biased into its applied condition by more springs than clutch assembly 112 is biased into its disengaged position. This difference in the number of springs and thus the activation load will result in a quicker engagement of clutch assembly 112 than the release of brake assembly 108 accurately providing overlap between the two independent assemblies while still utilizing a single control valve.

In addition to controlling the biasing load between the two independent assemblies by varying the number of coil springs 192 of clutch assembly 112, it is also necessary to accurately control the stroke of both application member 140 and application member 172. This stroke control is accomplished by providing the necessary thickness of a plurality of spacers 194 between retainer 154 and rear housing 110 to control the stroke of application member 140 of brake assembly 108 and by providing the necessary thickness of a plurality of spacers 196 between outer housing 166 and cover 170 to control the stroke of application member 172 of clutch assembly 112. The stroke of application members 140 and 172 are controlled such that the gap between adjacent interleaved plates of brake assembly 108 in its released condition is generally equal to the gap between adjacent interleaved plates of clutch assembly 112 in its disengaged condition. Thus, the stroke of application member 140 is preferably less than the stroke of application member 172 due to there being a fewer number of interleaved plates in brake assembly 108 when compared to the number of interleaved plates in clutch assembly 112 as shown in FIGS. 3 and 4.

Spacers 194 and 196 remove the normal build tolerances to provide accurate control over the strokes of application members 140 and 172. By selecting different thicknesses for spacers 194 and/or 196, the stroke of application members 140 and 170 can be adjusted. This in conjunction with controlling the biasing load of the brake assembly and the biasing load of the clutch assembly enable precise setting for the amount of overlap between independent brake assembly 108 and independent clutch assembly 112 and the utilization of a single control valve.

While the above detailed description describes the preferred embodiment of the present invention, it should be understood that the present invention is susceptible to modification, variation and alteration without deviating from the scope and fair meaning of the subjoined claims.

What is claimed is:

1. A conversion kit in combination with a drive unit for a machine having an input member and an output member, said drive unit including a stationary housing, an output shaft rotatably supported by said stationary housing and a planetary gear train, said output shaft being connected to one member of said planetary gear train and to said output member, said kit comprising:

an anchoring plate disposed between a second member of said planetary gear train and said stationary housing;

an input shaft connected to a third member of said planetary gear train;

a brake assembly disposed between said input shaft and said stationary housing, said brake assembly being movable between an applied condition and a released condition;

a clutch assembly disposed between said input shaft and said input member, said clutch being movable between an engaged condition and a disengaged condition.

2. The combination according to claim 1 wherein, said brake assembly comprises:

a rear housing connected to said stationary housing;

a brake hub connected to said input shaft; and a plurality of interleaved friction disks alternately connected to said rear housing and said brake hub.

3. The combination according to claim 2 wherein, said rear housing rotatably supports said input member.

4. The combination according to claim 2 wherein, said clutch assembly comprises:

an outer housing connected to said input member;

a clutch hub connected to said input shaft; and a plurality of interleaved friction disks alternately connected to said outer housing and said clutch hub.

5. The combination according to claim 1 further comprising a biasing member for urging said brake assembly into said applied condition.

6. The combination according to claim 1 further comprising a biasing member for urging said clutch into said disengaged condition.

7. The combination according to claim 1 further comprising:

a first biasing member for urging said brake into said applied condition; and a second biasing member for urging said clutch into said disengaged condition.

8. The combination according to claim 7 further comprising means for controlling the operational timing of said clutch assembly and said brake assembly such that said brake assembly is in said applied condition and said clutch is in said engaged condition simultaneously to provide a specified amount of overlap.

9. The combination according to claim 8 wherein, said first biasing member exerts a first load for urging said brake assembly into said applied condition, said second biasing member exerts a second load for urging said clutch assembly into said disengaged condition, and said controlling means comprises said first load being different from said second load.

10. The combination according to claim 8 wherein, said first biasing member includes a first plurality of springs, said second biasing member includes a second plurality of springs, and said controlling means comprises said second plurality of springs being different in number from said first plurality of springs.

11. The combination according to claim 1 further comprising means for controlling the operational timing of said clutch assembly and said brake assembly such that said brake assembly is in said applied condition and said clutch is in said engaged condition simultaneously to provide a specified amount of overlap.

12. The combination according to claim 1 wherein said brake assembly defines a brake stroke for moving said brake assembly between said applied condition and said released condition, said brake stroke being adjustable.

13. The combination according to claim 12 wherein said clutch assembly defines a clutch stroke for moving said clutch assembly between said engaged condition and said disengaged condition, said clutch stroke being adjustable.

14. The combination according to claim 1 wherein said clutch assembly defines a clutch stroke for moving said clutch assembly between said engaged condition and said disengaged condition, said clutch stroke being adjustable.

15. The combination according to claim 1 wherein said input shaft, said brake assembly and said clutch assembly form a sub-assembly with said input member.

* * * * *